United States Patent
Fedorov

(10) Patent No.: US 10,207,247 B2
(45) Date of Patent: Feb. 19, 2019

(54) DEVICE AND METHOD FOR HEAT AND MASS-EXCHANGE BETWEEN GAS AND LIQUID

(71) Applicant: Vladimir V. Fedorov, Novosibirsk (RU)

(72) Inventor: Vladimir V. Fedorov, Novosibirsk (RU)

(*) Notice: Subject to any disclaimer, the term of this patent is extended or adjusted under 35 U.S.C. 154(b) by 1013 days.

(21) Appl. No.: 14/283,924

(22) Filed: May 21, 2014

(65) Prior Publication Data

US 2015/0125351 A1    May 7, 2015

Related U.S. Application Data

(60) Provisional application No. 61/898,713, filed on Nov. 1, 2013.

(51) Int. Cl.

| | |
|---|---|
| *B01J 19/00* | (2006.01) |
| *B01J 19/26* | (2006.01) |
| *B01F 3/04* | (2006.01) |
| *B01J 8/44* | (2006.01) |
| *B01J 19/24* | (2006.01) |
| *B01J 19/32* | (2006.01) |
| *B01D 47/02* | (2006.01) |

(52) U.S. Cl.
CPC ............ *B01J 19/26* (2013.01); *B01D 47/021* (2013.01); *B01F 3/04985* (2013.01); *B01J 8/44* (2013.01); *B01J 19/24* (2013.01); *B01J 19/2405* (2013.01); *B01J 19/32* (2013.01); *B01J 2219/32206* (2013.01); *B01J 2219/32231* (2013.01); *B01J 2219/32241* (2013.01); *B01J 2219/32408* (2013.01); *B01J 2219/32483* (2013.01)

(58) Field of Classification Search
CPC ..... B01J 19/26; B01J 8/44; B01J 19/24; B01J 19/2405; B01J 19/32; B01J 2219/32206; B01J 2219/32231; B01J 2219/32241; B01J 2219/32408; B01J 2219/32483; B01F 3/04985; B01D 47/021
See application file for complete search history.

(56) References Cited

U.S. PATENT DOCUMENTS

| | | | |
|---|---|---|---|
| 5,161,315 A | 11/1992 | Long | |
| 5,409,672 A * | 4/1995 | Cetinkaya | B01F 5/0451 239/427.3 |
| 5,462,719 A | 10/1995 | Pedersen et al. | |

(Continued)

FOREIGN PATENT DOCUMENTS

| | | |
|---|---|---|
| DE | 3515300 A1 | 10/1986 |
| EP | 0088404 A2 | 9/1983 |

(Continued)

OTHER PUBLICATIONS

International Search Report from PCT/IB2014/061603, filed May 21, 2014, dated Sep. 25, 2014.

(Continued)

*Primary Examiner* — Anshu Bhatia
(74) *Attorney, Agent, or Firm* — Law Office of Ilya Libenzon

(57) ABSTRACT

A device for heat, mass, and chemical exchange and interaction between gases and liquids. Nozzles feed the gas at angles in different directions to form a gas-liquid mix, swirls, and/or foam above an array of such nozzles.

12 Claims, 16 Drawing Sheets

(56) References Cited

U.S. PATENT DOCUMENTS

| | | | |
|---|---|---|---|
| 5,891,401 A | 4/1999 | D'Aciemo et al. | |
| 6,334,985 B1 * | 1/2002 | Raghuram | B01J 8/20 |
| | | | 165/166 |
| 7,510,172 B2 | 3/2009 | Kojima | |
| 7,866,638 B2 * | 1/2011 | Neumann | B01D 53/1475 |
| | | | 239/594 |

FOREIGN PATENT DOCUMENTS

| | | |
|---|---|---|
| EP | 1716917 B1 | 4/2011 |
| RU | 1624751 A2 | 12/1996 |
| RU | 2072894 C1 | 2/1997 |
| RU | 2104752 C1 | 2/1998 |
| RU | 2132220 C1 | 6/1999 |
| SU | 1473790 A1 | 4/1989 |
| SU | 1542564 A1 | 2/1990 |

OTHER PUBLICATIONS

Supplementary European Search Report & Opinion for EP14858015, dated Apr. 5, 2017.

* cited by examiner

DEVICE AND METHOD FOR HEAT AND MASS-EXCHANGE BETWEEN GAS AND LIQUID

RELATED APPLICATIONS

This application claims priority to U.S. Provisional Application No. 61/898,713, filed Nov. 1, 2013, which is incorporated herein by reference in its entirety.

FIELD OF THE INVENTION

This invention is related to chemical, metallurgical, energy, and other industries, involving heat, mass and/or chemical exchange and interaction between two fluids, such as a gas and a liquid, for example, for removing dust and chemical contaminants from gases. It can used as a scrubber, an absorber, a desorber, heat exchanger, or a chemical reactor.

BACKGROUND OF THE INVENTION

Russian Patent RU 2132220 describes a device that uses dust collecting apparatus with a cylindrical housing and a blade swirling device creating a vortex along a vertical axis of the housing. A swirling device is arranged in an aerodynamic cavity and is sprinkled with water. The water is delivered directly onto swirler blades from a plate filled with water with slots on edges. A ring deflector is installed in an upper part of the cavity under which a row of flat-spray water feed nozzles is arranged. The device provides 99.5-99.9% cleaning of gases from dust at the resistance to air flow of 1200-1300 Pa and a specific consumption of reflux water of 0.1-0.15 l/nm. The indicated characteristics are provided due to high efficiency of water and gas distribution over the swirler's perimeter; the recirculation of water (pulp) in the swirler providing several-fold increase in active zone watering; washing of cleaned gases before a drop trap by clean feed water; installation of high efficiency drop trap of hood-type with corner members arranged over screw line. The device delivers enhanced efficiency of gas cleaning.

Russian Patent RU 2104752 describes devices for trapping of toxicants from gaseous effluents in emulsified flow of liquid used in power engineering, metallurgy, chemistry, and other branches of industry. The adapter is made in the form of a parallelepiped with an axial vane swirler secured in its bottom part and made of four vanes having the shape of obtuse triangles, whose obtuse angles are inscribed in the dihedral angles of the parallelepiped. The middles of the bases touch each other in one point lying in the parallelepiped axis. Windows are provided just above the vanes in the parallelepiped walls, initiators of emulsification in the form of four plates having the shape of right triangles also inscribed in the dihedral angles of the parallelepiped and decreasing its flow section by 10 to 25% are positioned above the windows.

The known foaming gas washers or plate gas washers used for cleaning gases of dust, of gaseous contaminants, etc. comprise a horizontal plate with holes or slots. When an irrigating liquid is dripped onto the plate from above and a gas is fed from below, turbulent foam is formed where gas bubbles are continuously created, merged, and destroyed. Such plates are usually made with holes 4-8 mm in diameter or with slots 4-5 mm wide. The number of holes or slots is chosen so that the ratio of cumulative cross-section area of holes or slots to the total area of the plate is 0.15-0.25.

SUMMARY OF THE INVENTION

The invented device has a high efficiency of gas, heat, and chemical exchange, reaction, and interaction between a gas and a liquid, is highly reliable, and inexpensive for both manufacturing and operation.

The grid plate is configured so that the jets of the gas intended for cleaning are not vertical, but rather sloping in a variety of directions. These jets intersect and interact to form above the grid plate a gas-liquid mix, such as foam. The jets' intersections cause a rapid increase in the relative speeds of the gas and liquid droplets within these jets. This improves the efficiency of the heat and mass exchange between the gas and the irrigating liquid, even when the slots or openings in the grid plate are relatively large (for example, when compared with prior art devices).

There is a variety of specific configurations of the grid plates for forming jets sloping in different directions. The effect of improved interaction between the gas and the liquid is greatly pronounced for the plates providing the jets in the directions significantly far of the normal to the grid plate and with directions as close as possible to the plate surface being the most advantageous for a given ratio of openings' (or slots') cumulative cross-section to the total area of the grid plate. A plate forming gas jets sloping in various directions may be a perforated sheet where the openings or perforations are shaped to cause the passing gas to form a sloping jet, or an array of parallel swirling nozzles with blades, or an array of slots constructed, for example, of angular elements.

One embodiment of the present invention is an apparatus comprising a housing comprising an inlet and an outlet for passing a fluid along a fluid path in the housing from the inlet to the outlet; a plurality of nozzles arranged in a grid, the grid being disposed inside the housing in the path of the fluid; each nozzle comprising a three-dimensional structure with a plurality of axial swirler blades disposed inside the three-dimensional structure, each swirler blade being a tilted quadrangle, each quadrangle having two adjacent sides in contact with two adjacent sides of the three-dimensional structure, and each quadrangle having two other adjacent sides intersecting at a same real or imaginary vertex on a vertical axis of the quadrangle. The fluid passing inside the housing can be a gas. The apparatus further comprises an inlet for supplying an irrigating liquid to the housing, the inlet for supplying being disposed along the fluid path after the grid and before the outlet. The tilted quadrangle can be a tilted rectangle, which also can be curved. The three-dimensional structure of the apparatus can be a parallelepiped.

In one embodiment of the invention each nozzle of the grid is constructed to swirl the gas in one direction. The nozzles in the grid can be arranged in the grid in parallel.

In yet another embodiment of the invention the grid can be comprised of a plurality of fastening elements, wherein each fastening element is disposed in the imaginary vertexes of the plurality of nozzles.

In yet another embodiment of the invention at least a portion of each edge of each side of the three-dimensional structure is cut in such a way that at least the portion of each edge does not protrude beyond one of the two adjacent sides of the quadrangle in contact with the three-dimensional structure.

The method of the present invention comprises supplying a fluid through an inlet to enter a housing and passing the fluid along a fluid path; passing the fluid through a plurality of nozzles arranged in a grid, the grid being disposed inside the housing between the inlet and the outlet; forming a plurality of intersecting streams from the fluid as the fluid passes through gaps formed by adjacent axial swirler blades of the plurality of nozzles; supplying an irrigating liquid into the housing from above the grid through at least one inlet and causing the plurality of intersecting streams and the irrigating liquid to mix above the grid; wherein each nozzle of the plurality of nozzles comprises a three-dimensional structure with a plurality of axial swirler blades disposed inside the three-dimensional structure, each swirler blade being a tilted quadrangle, each quadrangle having two adjacent sides in contact with two adjacent sides of the three-dimensional structure, and each quadrangle having two other adjacent sides intersecting at a same real or imaginary vertex on a vertical axis of the quadrangle.

The fluid supplied through the inlet can be a gas. The working speed of the gas along the fluid path can be about 5 m/s. The nozzles are arranged in the grid in parallel. The invention contemplates that each nozzle can swirl the gas in the same direction.

In yet another aspect of the invention supplying the irrigating liquid into the housing through at least one inlet occurs without using spraying jets. At least one inlet is disposed along the fluid path after the grid and before the outlet.

In yet another aspect of the method of the present invention the grid further comprises a plurality of fastening elements, each fastening element being disposed in the imaginary vertexes of the plurality of nozzles.

In yet another aspect of the invention a nozzle for forming a grid, the nozzle comprises a three-dimensional structure and a plurality of axial swirler blades disposed inside the three-dimensional structure; each swirler blade being a tilted quadrangle having a first pair of adjacent sides and a second pair of adjacent sides; the first pair of adjacent sides being in contact with adjacent sides of the three-dimensional structure; and the second pair of adjacent sides intersecting at a same real or imaginary vertex on a vertical axis of the quadrangle; wherein each two adjacent swirler blades of the plurality of axial swirler blades form a gap in such a way that a stream of fluid exiting that gap intersects with another stream of fluid exiting an adjacent gap.

The nozzle can further comprise a fastening element disposed in the imaginary vertexes of the nozzle. Furthermore, at least a portion of each edge of the three-dimensional structure of the nozzle is cut in such a way that at least the portion of each edge does not protrude beyond one side of the first pair of adjacent sides of the quadrangle in contact with the three-dimensional structure.

Still other objects and aspects of the present invention will become readily apparent to those skilled in this art from the following description wherein there are shown and described preferred embodiments of this invention, simply by way of illustration of the best modes suited for to carry out the invention. As it will be realized by those skilled in the art, the invention is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention.

FIG. 2c shows an example of a plate grid formed by multiple instances of the plate grid shown in FIG. 2a.

FIG. 3c show a grid plate composed of nine nozzles of FIG. 3a.

FIG. 4c show a grid plate composed of nine nozzles of FIG. 4a.

FIG. 6c show a grid plate composed of seven nozzles of FIG. 6a.

DETAILED DESCRIPTION OF THE PREFERRED EMBODIMENTS

The present device provides efficient heat and mass exchange between a gas and a liquid, while being highly reliable and coast efficient in terms of capital and operating costs.

Figure 1:
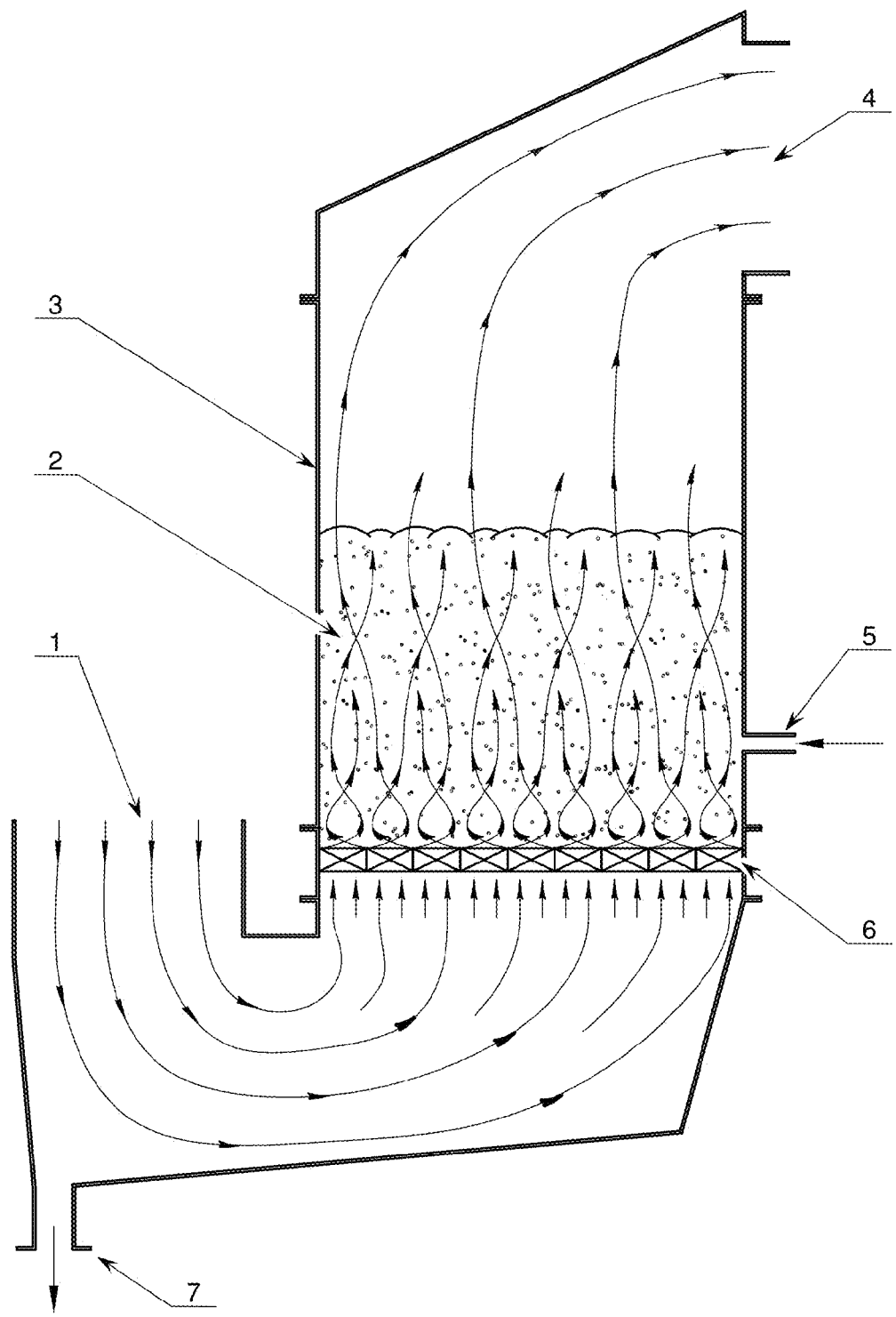
FIG. 1 shows schematically the gas flowing through a one-stage device.

FIG. 1 schematically shows an embodiment of the present invention in the housing 3. A gas is supplied through a gas inlet 1 to pass through a grid plate 6, though a gas-liquid mix 2 and into a gas outlet 4. The liquid, such as water, is injected into the gas-liquid mix 2 from a nozzle 5 positioned above the grid 1. The liquid passing downward through the grid 6 is drained through a drain 7.

The gas is moving though the device, for example, by being pressure-fed though the inlet 1 and/or by being sucked out though the outlet 4. The pressure differential may be created by a fan, so that the gas moves upward through the grid plate 6. The liquid from the nozzle 5 irrigates the grid plate 6. No provisions for spraying the liquid are necessary for the device.

The grid plate 6 is composed of nozzles (made of plastic, metal, etc.), such as shown in FIGS. 2a-2d, 3a-3d, 4a-4c, 5, 6a-6d, and 7a-7b creating intermixing jets of gas forming turbulent flows, swirls, and/or other non-linear flows of gas in the gas-liquid mix 2 for efficient mixing and interacting with the liquid supplied above the grid.

The nozzles comprising opening or slots in the grid 6 form gas jets having different directions. The liquid from the nozzle 5 is captured by these jets (preferably near their nozzles) and forms droplets. The gas jets form an interwoven structure above the grid as shown in the examples in FIGS. 2d, 5, 6d, and 7b, however the invention is not limited to these specific examples of jet configuration, other angles and other forms and positions of jets are possible as well. As the gas jets intermix, the relative speeds of the gas and the liquid droplets within the gas jets increase dramatically. This dynamics of the flow within the jets also provides uniformity of distribution of the liquid above the grid and intermixing of the gas and liquid over the grid 6 along the entire cross-section of the housing without need for spraying of the irrigating liquid by the nozzle. This results in non-linear (for example, turbulent) flows within a resulting gas-liquid mix, which can be foam. This gas-liquid mix has very high area of gas-liquid contact per volume. This mix renews quickly and is uniform. This improves the efficiency of the heat and mass exchange even when the opening or slots are relatively large compared with the prior art devices. In one embodiment the gas flow through the inlet pipe is at about 5 m/s while the flow through the nozzles in the grid plate is about 15-30 m/s.

The mixing of the gas jets passing through the opening or slots in the grid 6 with the liquid, such as water, supplied from the nozzle 5 takes place above the grid 6, rather than on it. This reduces the wear of the grid and prolongs its usefulness.

When the gas and the irrigating liquid enter the device through the inlet 1 and the nozzle 5 respectively, the liquid begins to accumulate in the gas-liquid mix layer (or foam) 2. The height of this layer increases until the upward gas pressure of the gas passing through the openings or slots in the grid is balanced by the weight of the gas-liquid mix layer above the grid. Subsequently, the amount of liquid supplied from the nozzle 5 would correspond to the amount of liquid pushed under the weight of the gas-liquid mix down through the grid's slots or openings into the bottom part of the housing 3. Effects of droplets escaping with the gas and vapor through the outlet 4, evaporation and condensation of the liquid must also be accounted for while feeding the liquid into the device through the nozzle 5. The remainder of the discharged liquid is transferred from the device through the drain 7.

Figure 1A:
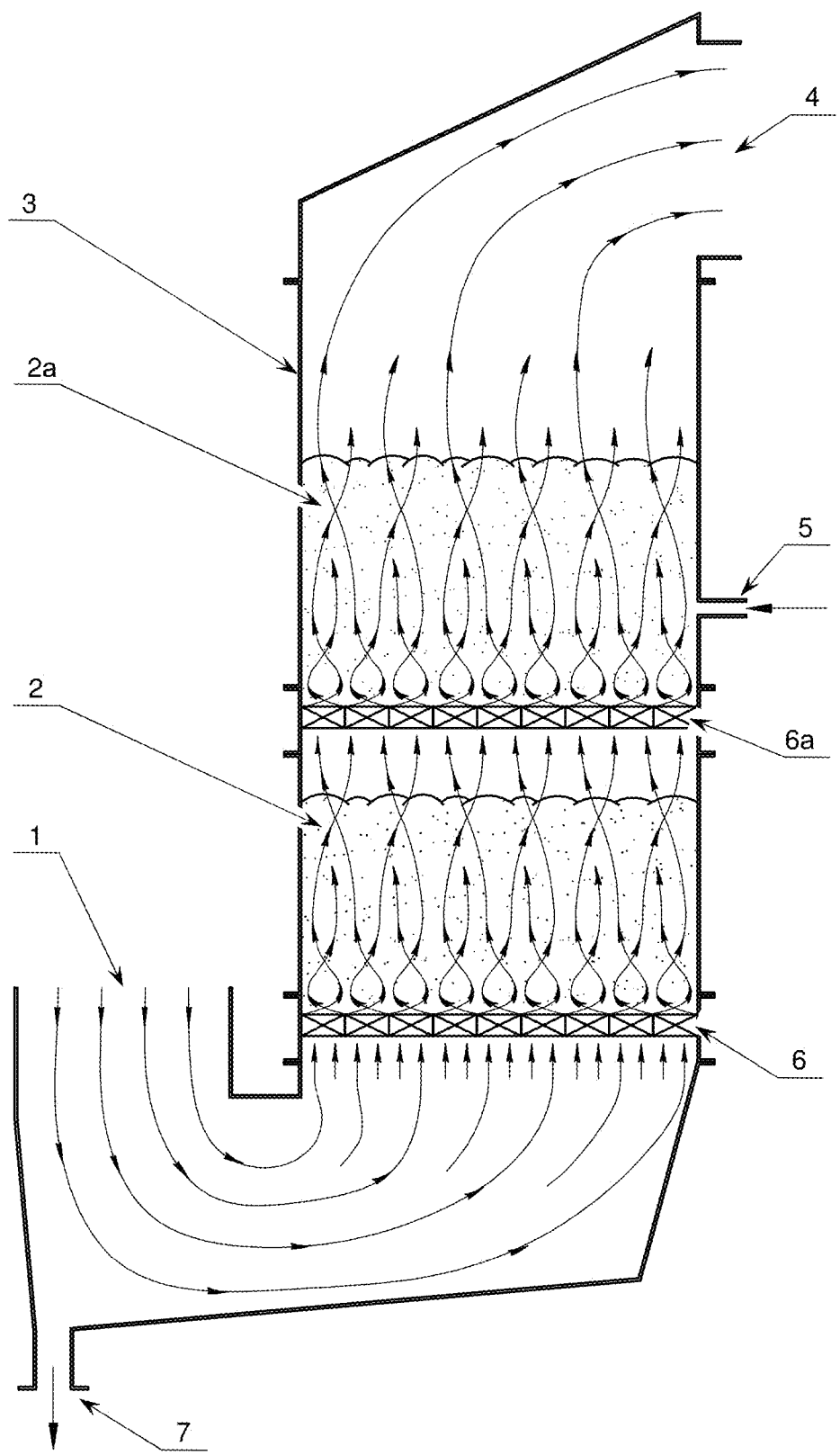
FIG. 1a shows schematically the gas flowing through a two-stage device.

FIG. 1a shows a two-stage embodiment of the present invention, where a second grid plate 6a is positioned above the grid plate 6. The liquid supplied from the nozzle 5 above the second grid plate 6a interacts with the gas within the gas-liquid mix 2a above the second grid plate 6a. The liquid then drips through the second grid plate 6a downward to interact with the gas above the grid plate 6 within the gas-liquid mix 2.

Generally, in two-stage or multiple stage devices, comprising two or more grid plates one above the other, the irrigating liquid is fed through the nozzle 5 onto the top grid plate 6a and the primary accumulation of liquid takes place in the gas-liquid 2a mix above the top grid plate 6a. After accumulating within the gas-liquid mixture on the bottom grid plate, the liquid drains into the bottom part of the housing 3 and is transferred from the device through the drain 7. The gas to be cleaned is fed through the gas inlet 1, and the cleaned gas is removed through the gas outlet 4.

The distance between the grid plates may be 0.4-0.6 m. The counterflow in the device shown in FIG. 1a reduces the required amount of liquid for cooling of gases and/or purifying of gases at high concentration of contaminants. In such cases, the ratio of cumulative cross-section area of openings or slots to the total area of the grid plate may be increased for the bottom grid plate compared with other grid plates. For the gases hotter than 250° C. this increase is about 20%; for the gases hotter than 400° C. this increase is about 30%; etc.

Instead of a gas shown in FIGS. 1-1a, any fluid, such as a liquid, may be used generally in the same way.

Instead of a liquid shown in FIGS. 1-1a, any fluid, such as gas (especially a gas that is heavier than air), may be used generally in the same way.

Figure 2A:
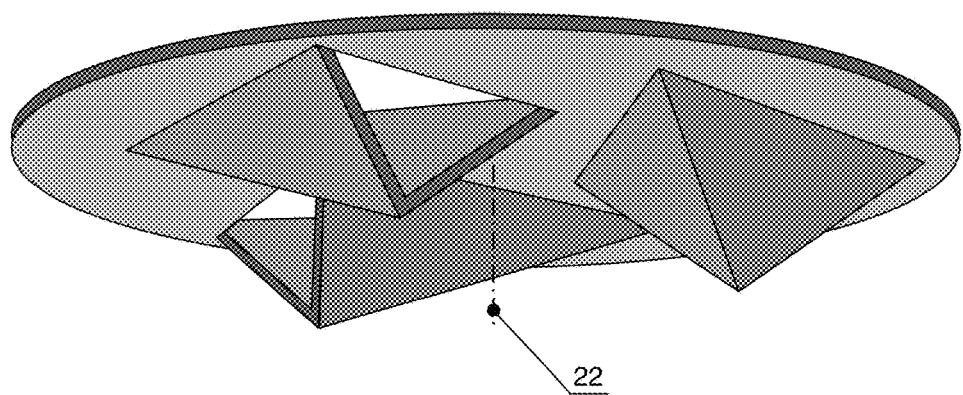
FIG. 2a shows an example of a plate grid.

FIG. 2a shows an example of a grid plate shaped as a plate with three nozzle perforations for use in the devices shown in FIGS. 1-1a. Each nozzle in this plate is shaped as a pyramid with a triangular base. Each pyramid is missing the base face and one of the side faces. The three identical pyramids are positioned symmetrically around the plate center 22 at a 120° angle to each other. Other perforations with sloping elements extending downwards are possible.

Figure 2B:
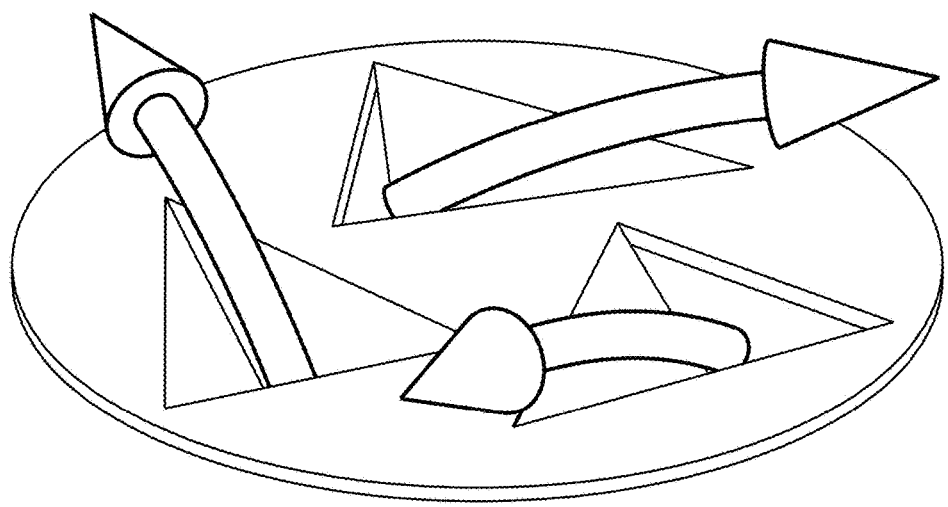
FIG. 2b shows the plate grid with arrows for the gas jets formed by the nozzles.

FIG. 2b shows (as arrows) gas jets flowing upward through the nozzles in the plate shown in FIG. 2a. These gas jets form an upwardly moving swirl within the housing 3.

Figure 2C:
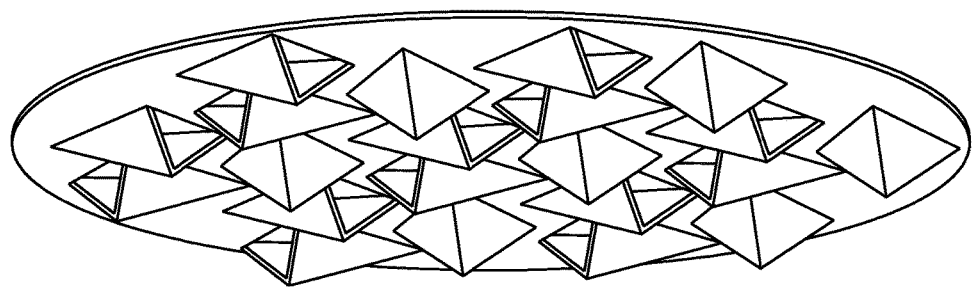

FIG. 2c shows an example of a grid plate shaped as a plate with multiple nozzle perforations for use in the devices shown in FIGS. 1-1a. Each nozzle in this plate is shaped as a pyramid with a triangular base. Each pyramid is missing the base face and one of the side faces. The pyramids are grouped in threes, and each such group is positioned symmetrically around its respective center on the plate at a 120° angle to each other.

Figure 2D:
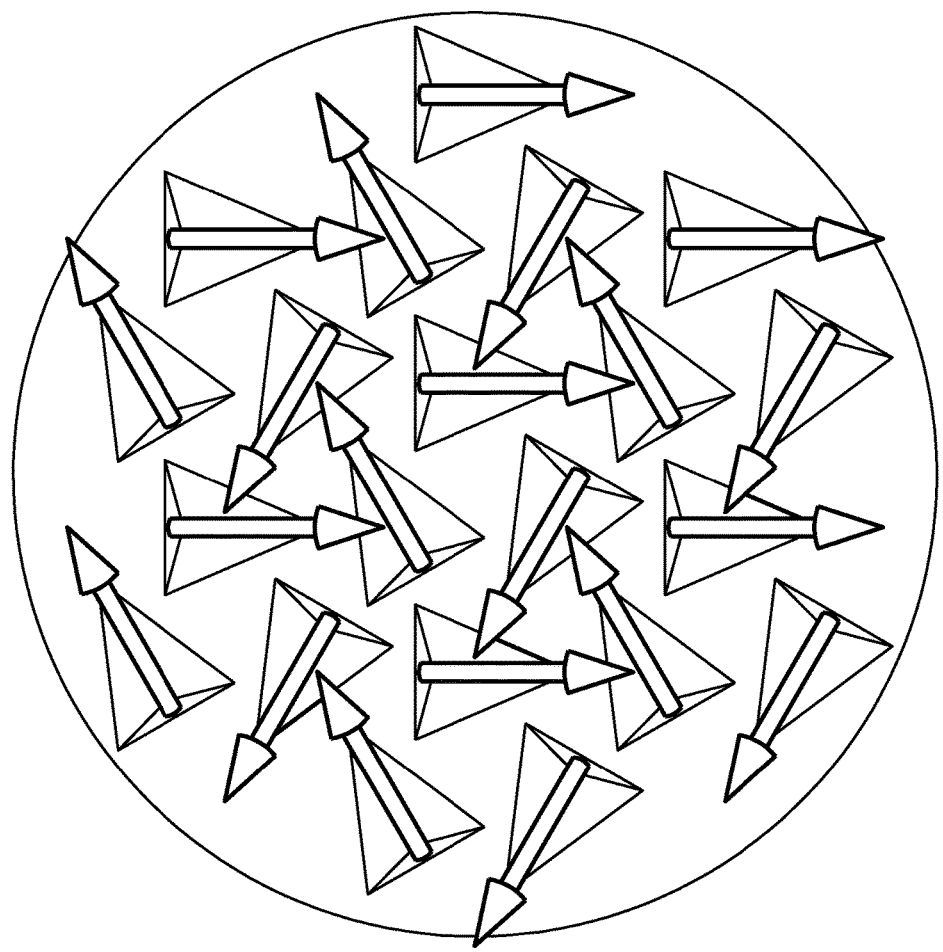
FIG. 2d shows the grid plate formed by multiple instances of the plate grid shown in FIG. 2a with arrows for the gas jets formed by the nozzles.

FIG. 2d shows (as arrows) gas jets flowing upward through the nozzles in the plate shown in FIG. 2c. These gas jets form an upwardly moving swirl within the housing 3. These jets cross, interact, and intermix to form upwardly moving swirls.

Figure 3A:
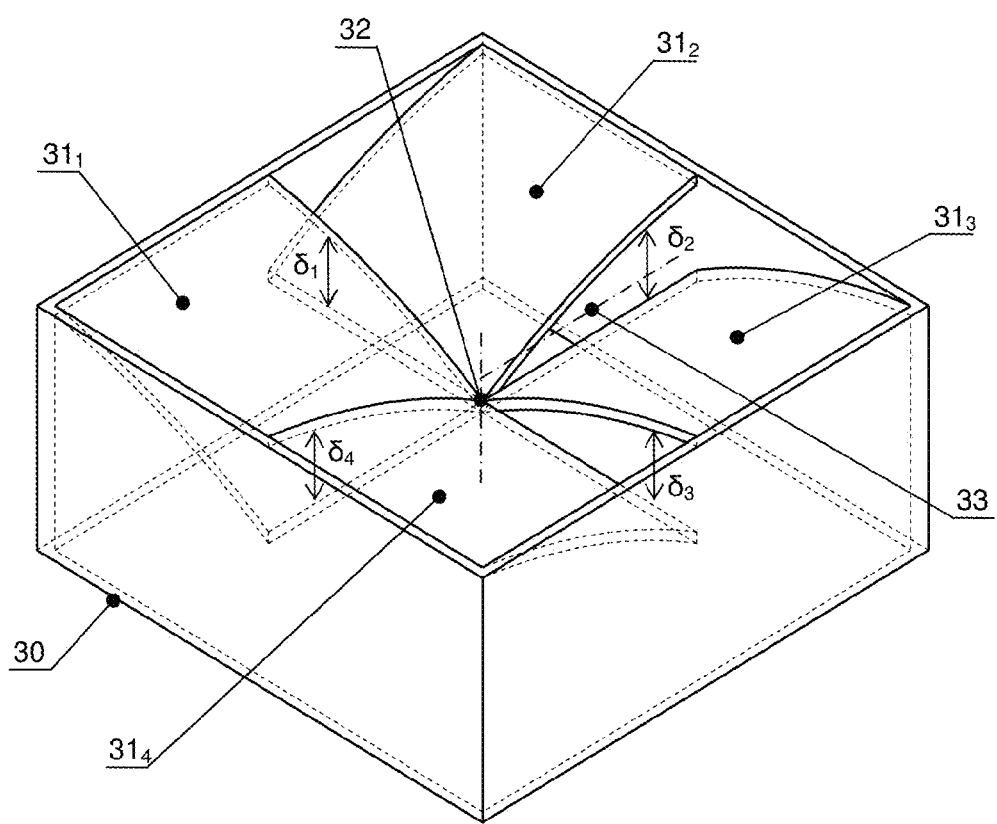
FIG. 3a shows a quadrangular axial swirling nozzle with four blades.

FIG. 3a shows an example of a quadrangular swirling nozzle 30 for forming grids 6 and/or 6a in the devices shown in FIGS. 1-1a. The nozzle 30 comprises four blades 311, 312, 313, and 314 to form four jets of gas. The corners of the blades meet at a point 32. Each blade is quadrangular with a uniform curvature in one dimension. The curvature of each blade is around its respective axis passing though the point 32 and normal to one of the sides of the nozzle 30. One such axis is shown as a dashed line 33. The blades 311 and 312 form a gap δ1, the blades 312 and 313 form a gap δ2, the blades 313 and 314 form a gap δ3, and the blades 314 and 311 form a gap δ4.

Figure 3B:
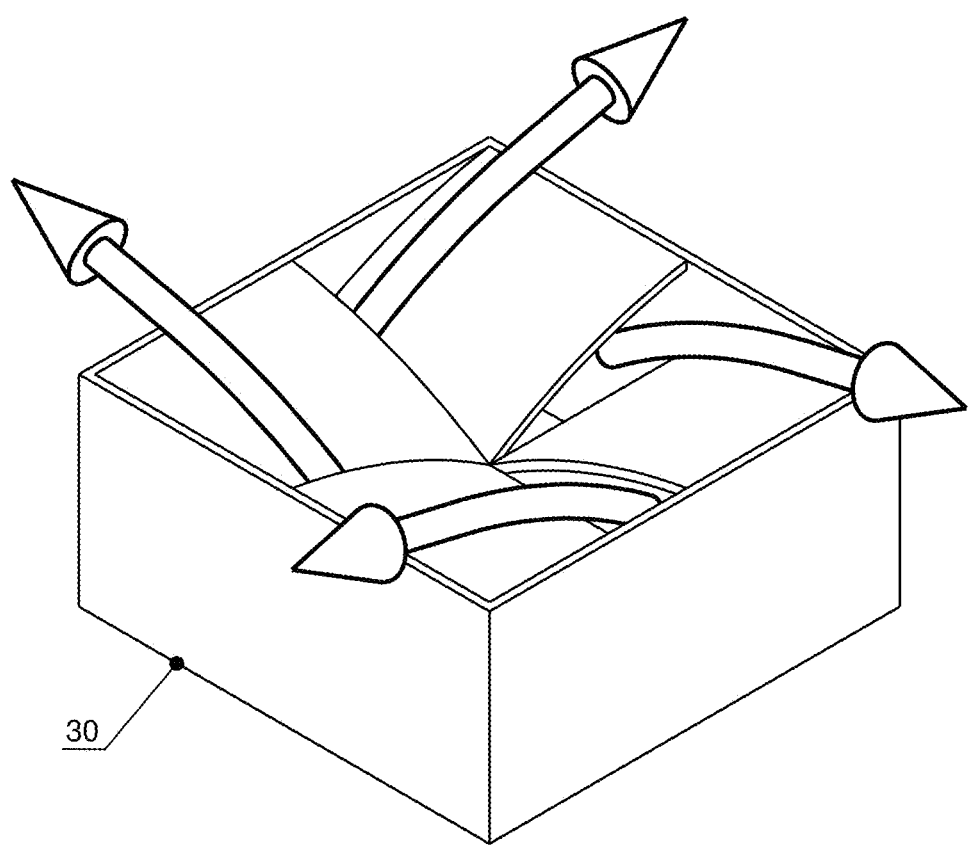
FIG. 3b shows the quadrangular axial swirling nozzle with four blades of FIG. 3a with arrows for the gas jets formed by the nozzle.

FIG. 3b shows as arrows four gas jets formed by the nozzle 30 shown in FIG. 3a. Each jet is passing through one of the gaps δ1-δ4.

Figure 3C:
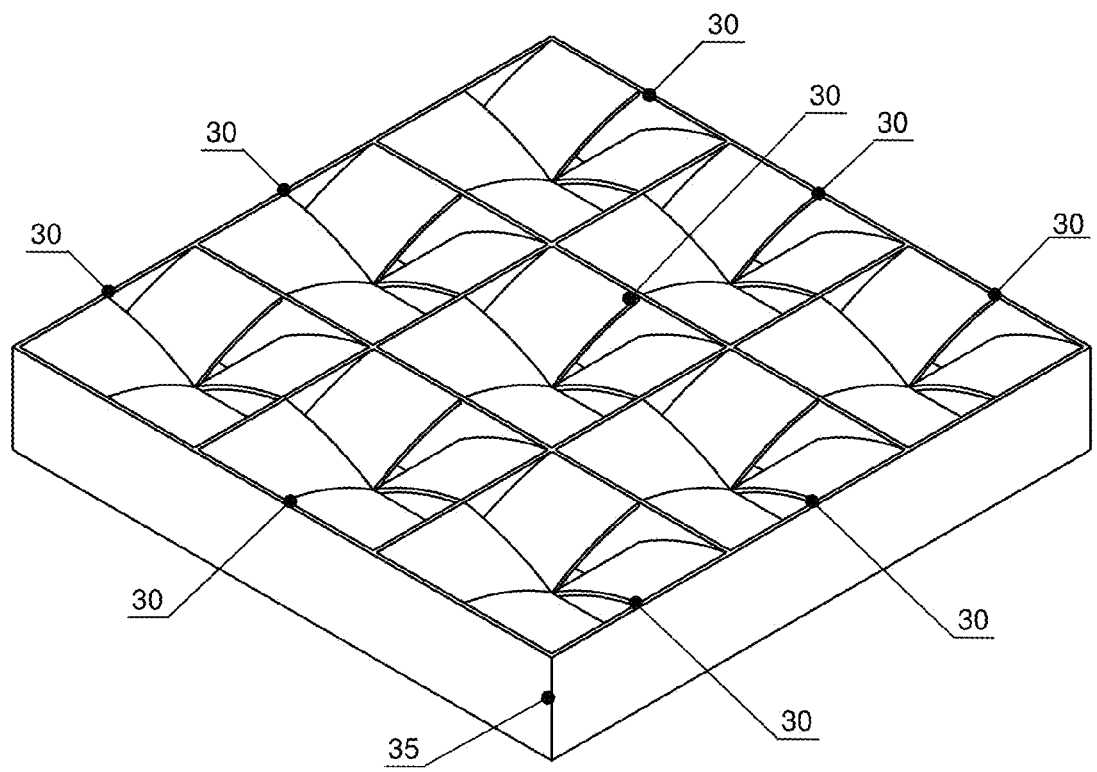

FIG. 3c shows an example of a grid plate 35 composed of nine swirling nozzles 30. The grid plate 35 is regular and uniform to form a uniform distribution of liquid within the gas-liquid mix above the grid plate 35.

The gas jets formed by the openings or slots in a grid plate can be quite abrasive. Therefore, it is useful to minimize the number and size of the structural elements these jets impact above the grid plate. Otherwise these elements would not only interfere with the jet formation, but also would be subject to much wear. However, above the blades in the nozzle at the central axial locations the abrasive effect may be minimal. These locations may be used for axial rods or other structural elements, for example, for attaching the grid plate of its components.

Figure 4A:
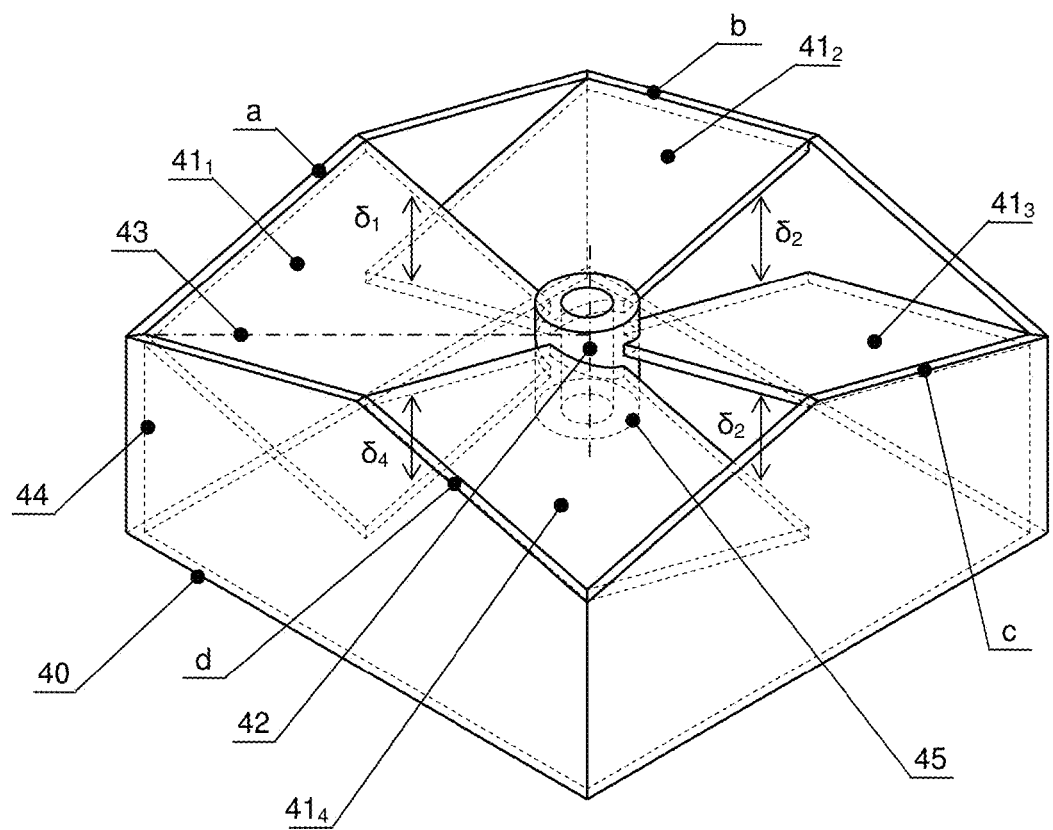
FIG. 4a shows another quadrangular axial swirling nozzle with four blades.

FIG. 4a shows an example of a quadrangular swirling nozzle 40 for forming grids 6 and/or 6a in the devices shown in FIGS. 1-1a. The nozzle 40 comprises four blades 411, 412, 413, and 414 to form four jets of gas. The lines along the edges of the blades meet at a virtual point 42. Each blade is quadrangular and flat. Each blade is tilted around its respective axis passing though the virtual point 42 and normal to one of the edges of the nozzle 40. One such axis is shown as a dashed line 43. The upper edges of the swirling nozzle 40 are in line with edges of the blades. The nozzle edge a is in line with an edge of the blade 411, the nozzle edge b is in line with an edge of the blade 412, the nozzle edge c is in line with an edge of the blade 413, the nozzle edge d is in line with an edge of the blade 414. A hollow sleeve 45 (for installation and attachment purposes) is positioned along the center vertical axis of the nozzle. The blades 411 and 412 form a gap δ1, the blades 412 and 413 form a gap δ2, the blades 413 and 414 form a gap δ3, and the blades 414 and 411 form a gap δ4.

Figure 4B:
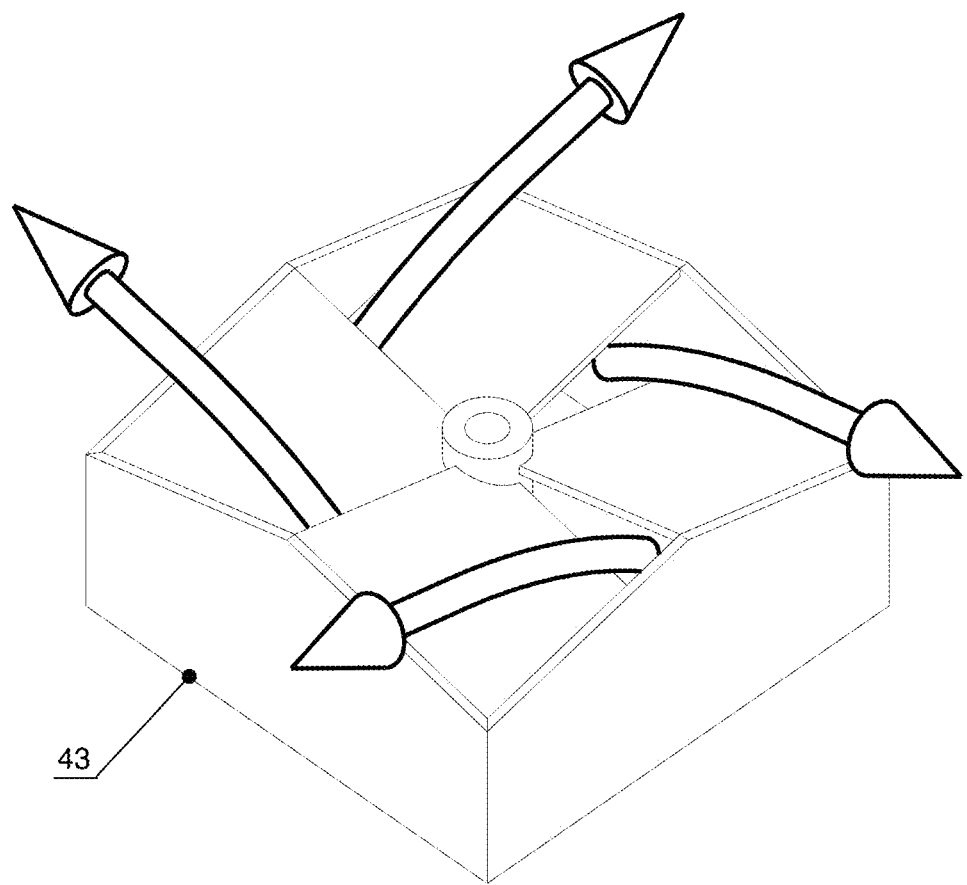
FIG. 4b shows the quadrangular axial swirling nozzle with four blades of FIG. 4a with arrows for the gas jets formed by the nozzle.

FIG. 4b shows as arrows four gas jets formed by the nozzle 40 shown in FIG. 4a. Each jet is passing through one of the gaps δ1-δ4.

Figure 4C:
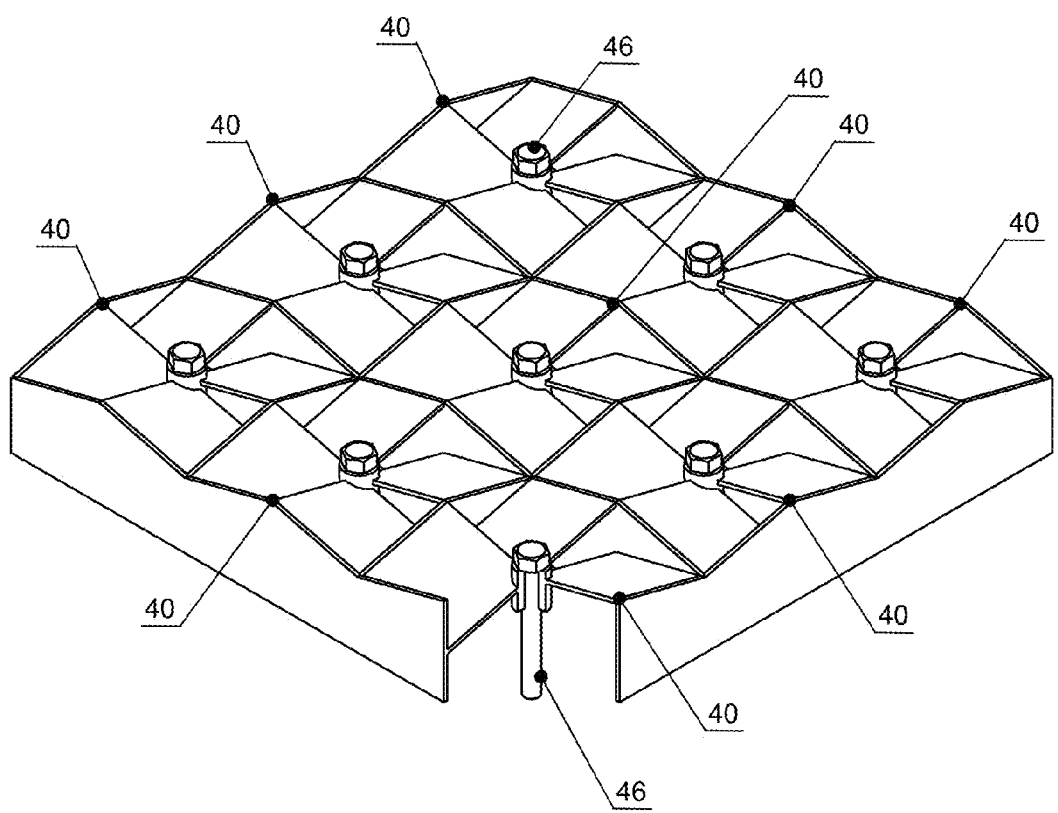

FIG. 4c shows an example of a grid plate composed of nine swirling nozzles 40. The grid plate is regular and uniform to form a uniform distribution of liquid within the gas-liquid mix above the grid plate. The sleeves are installed on the rods 46.

Figure 5:
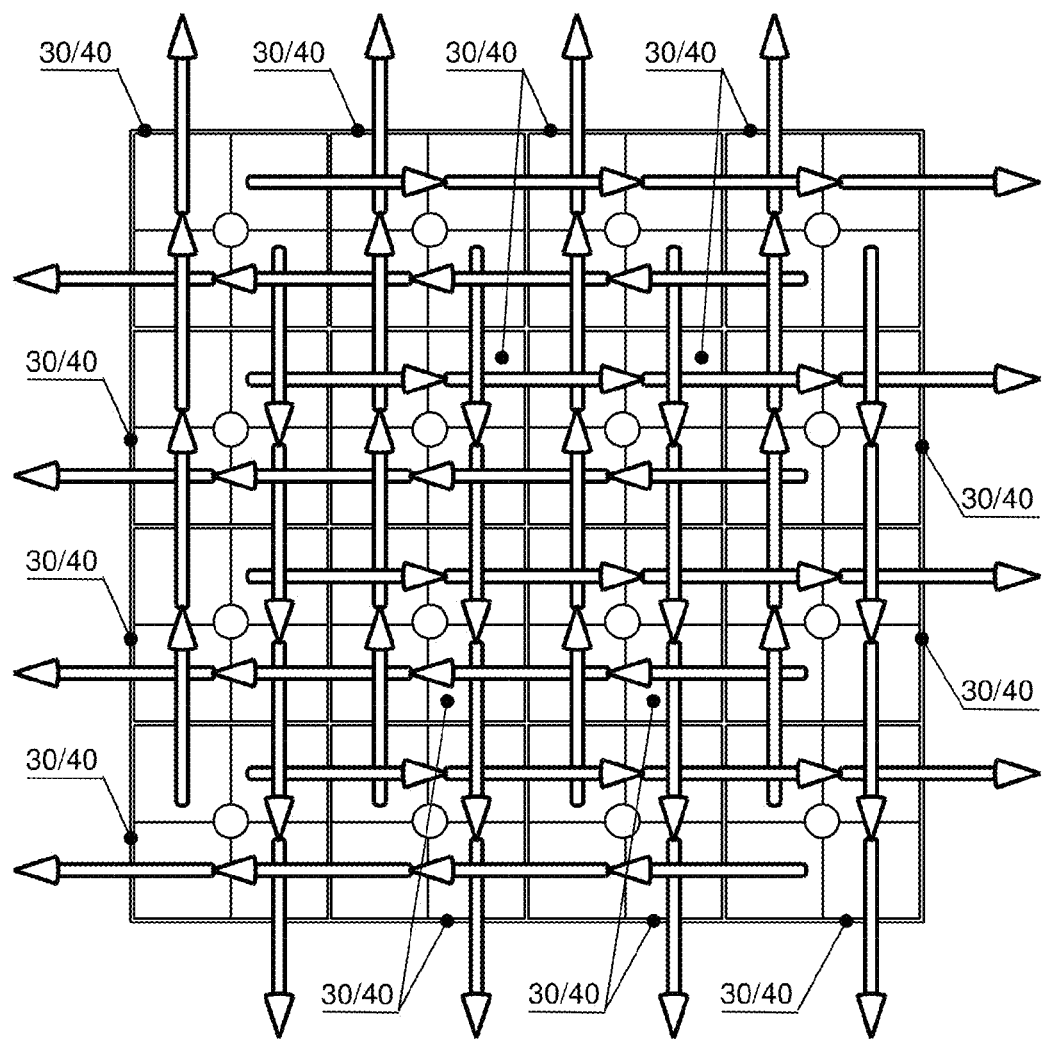
FIG. 5 shows grid plate composed of nine nozzles of FIG. 3a or FIG. 4a with arrows for the gas jets formed by the nozzles.

FIG. 5 shows as arrows crossing jets of gas mixing with liquid above a grid plate composed of sixteen swirling nozzles 30 or 40. Each jet is formed by one of the swirling nozzles. Each swirling nozzle forms four jets, as shown in FIGS. 3b and 4b.

Figure 6A:
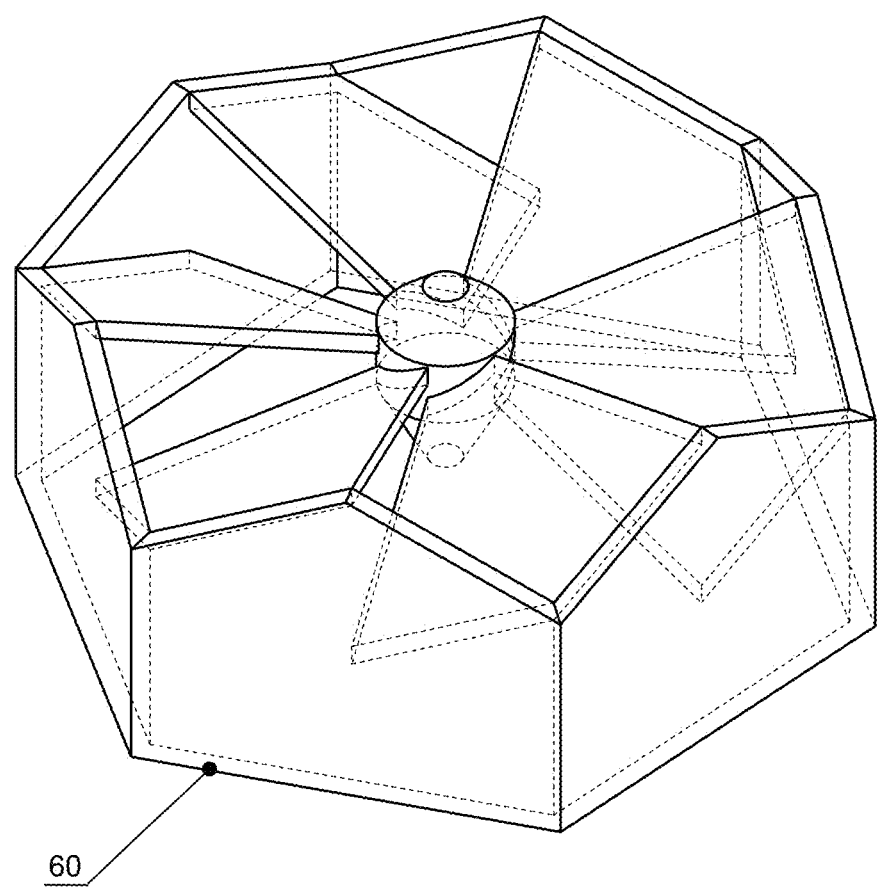
FIG. 6a shows a hexagonal axial swirling nozzle with six blades.

FIG. 6a shows an example of a hexagonal swirling nozzle 60 for forming grids 6 and/or 6a in the devices shown in FIGS. 1-1a. The nozzle 60 comprises six flat blades to form six jets of gas in a way similar to a quadrangular swirling nozzle 40 shown in FIG. 4a.

Figure 6B:
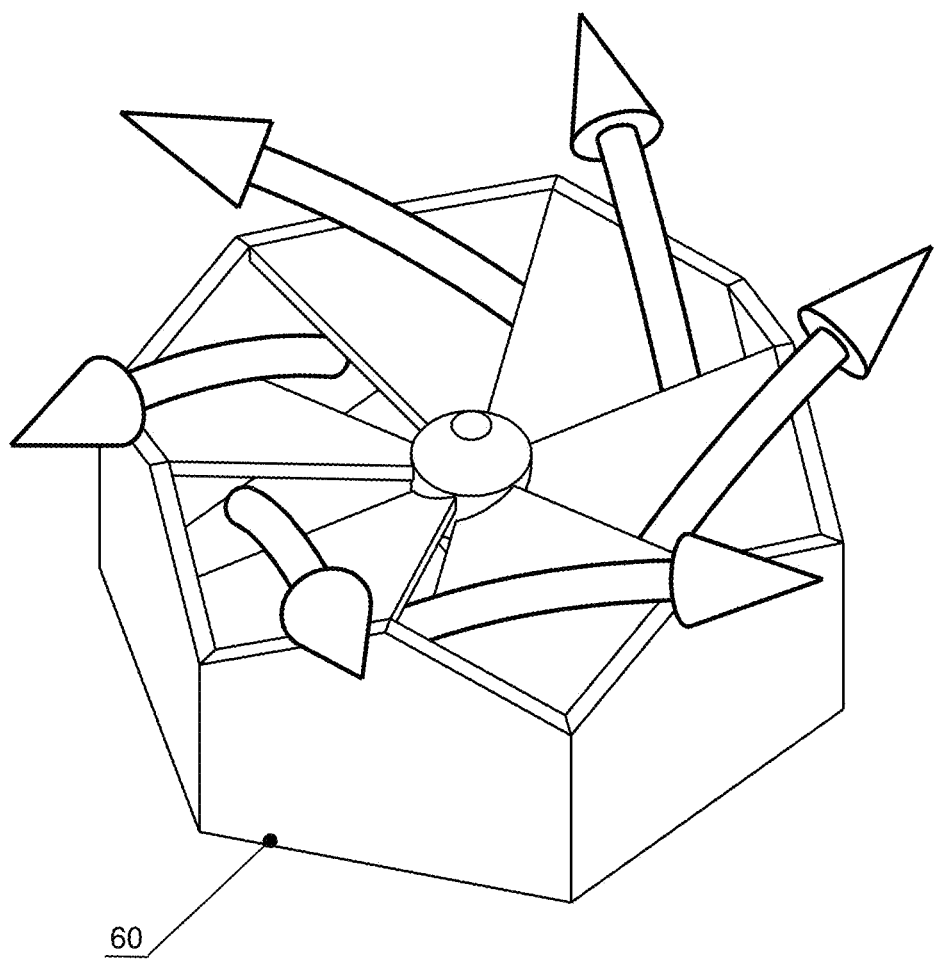
FIG. 6b shows the hexagonal axial swirling nozzle with six blades of FIG. 6a with arrows for the gas jets formed by the nozzle.

FIG. 6b shows as arrows six gas jets formed by the nozzle 60 shown in FIG. 6a. Each jet is passing through one of the gaps between the blades.

Figure 6C:
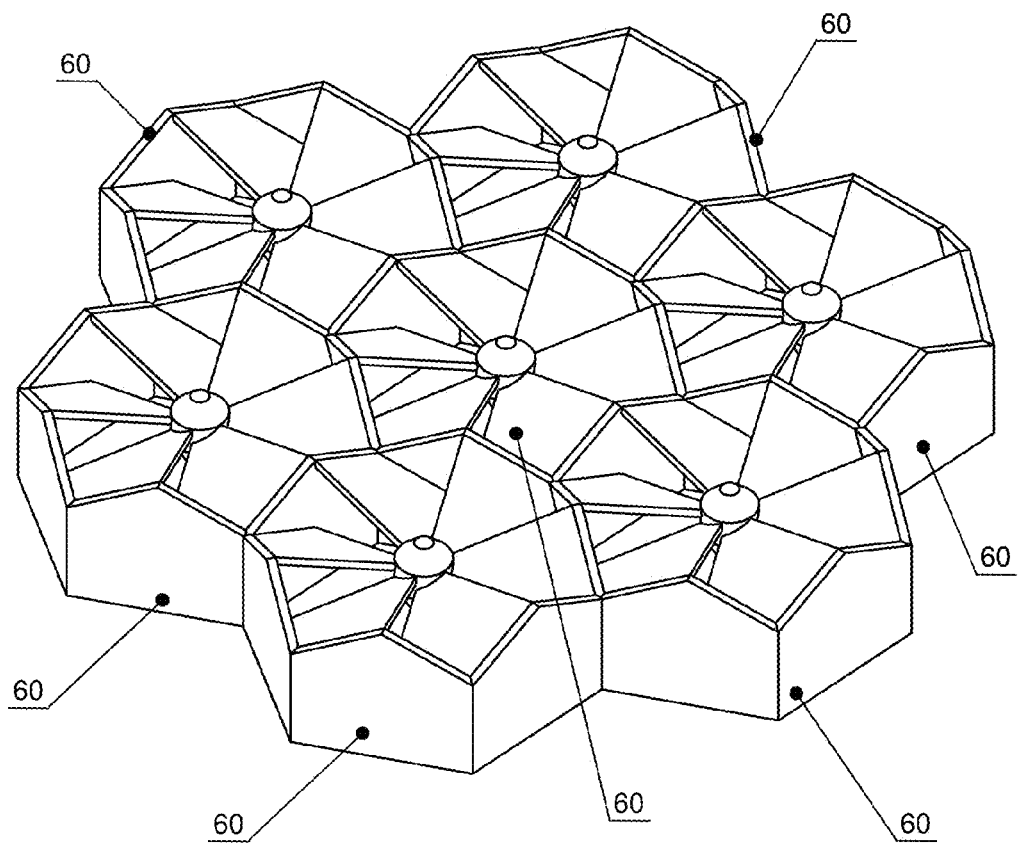

FIG. 6c shows an example of a grid plate composed of seven swirling nozzles 60. The grid plate is regular and uniform to form a uniform distribution of liquid within the gas-liquid mix above the grid plate.

Figure 6D:
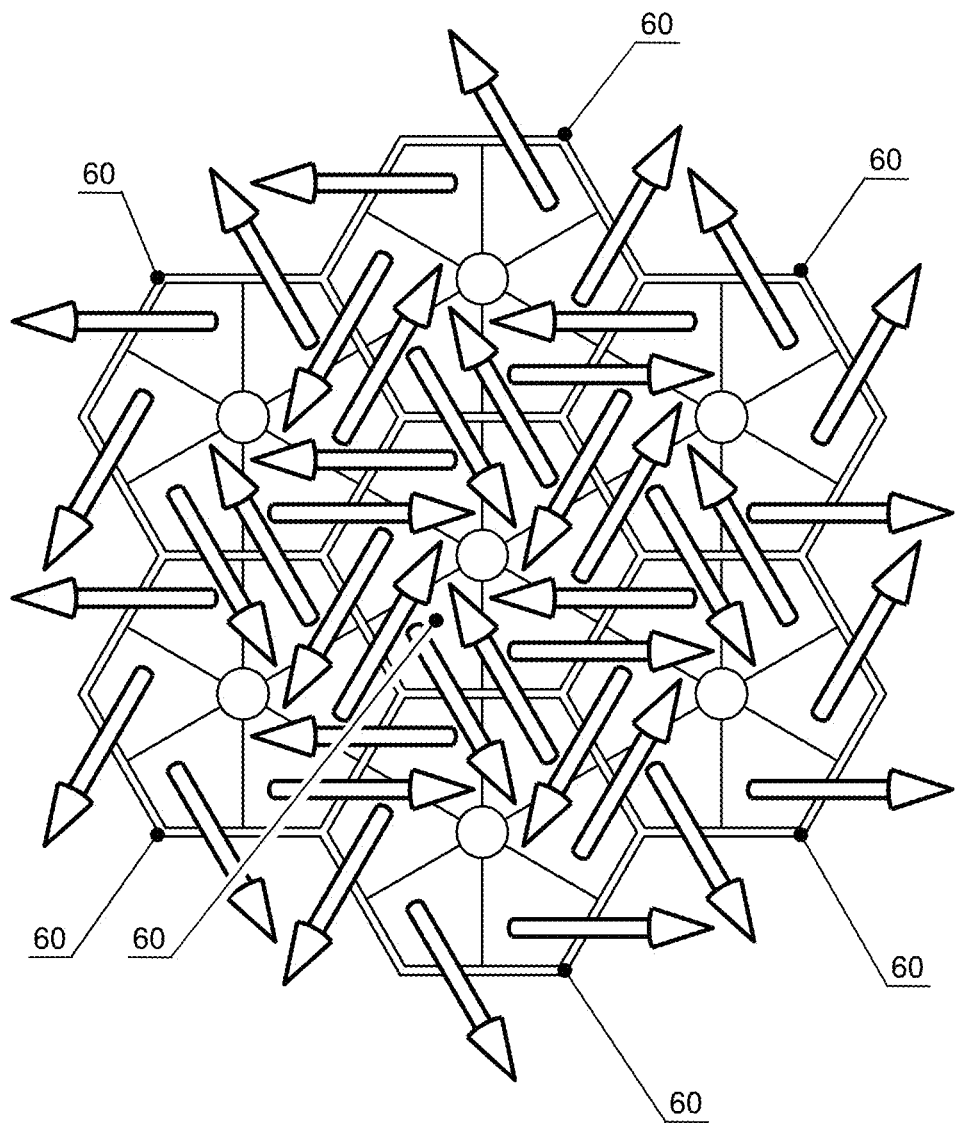
FIG. 6d shows grid plate composed of seven nozzles of FIG. 6a with arrows for the gas jets formed by the nozzles.

FIG. 6d shows as arrows crossing jets of gas mixing with liquid above a grid plate composed of seven hexagonal swirling nozzles 60 with six blades each. Each jet is formed by one of the swirling nozzles. Each swirling nozzle forms six jets, as shown in FIG. 6b.

Figure 7A:
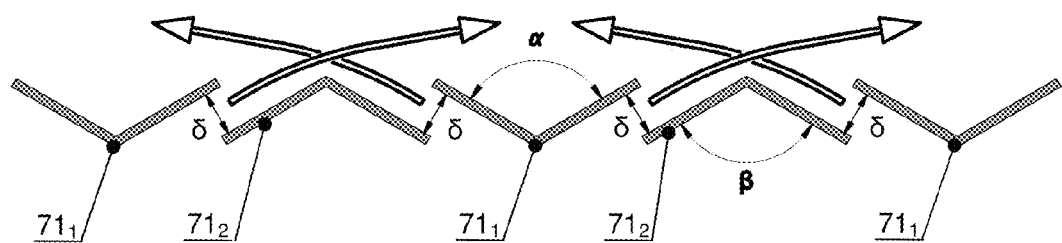
FIG. 7a shows a cross-section of a slotted grid plate composed of angular elements.

FIG. 7a shows a cross-section of a slotted grid plate composed of angular elements for the devices shown in FIGS. 1-1a. The angular elements 711 with an angle α point downwards. The angular elements 712 with an angle β point upwards. The aerodynamic resistance of such a plate is reduced when β is less than α, so that gaps δ are uniformly narrowing in upward direction. However, the angles α and δ may be equal as well. The arrows show gas jets formed by a gas passing through the gaps δ.

Figure 7B:
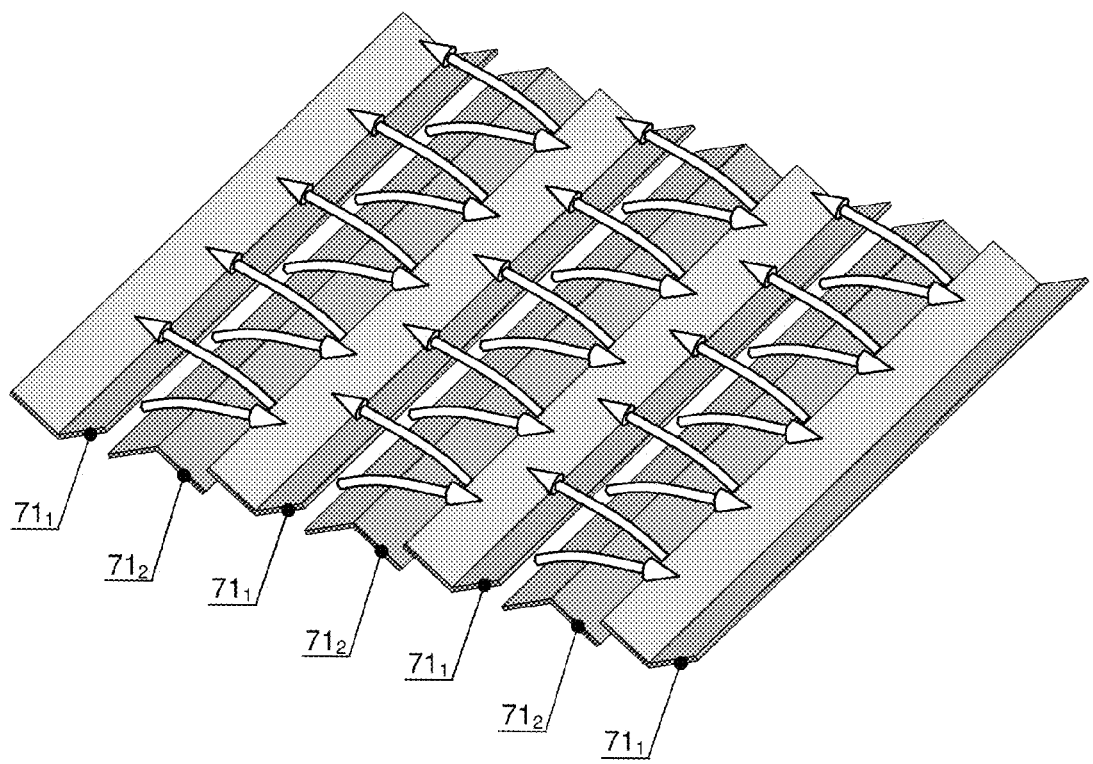
FIG. 7b shows the slotted grid plate of FIG. 7a with arrows for the gas jets formed by the slots.

FIG. 7b shows as arrows crossing jets of gas mixing with liquid above the slotted grid plate of FIG. 7a.

The advantages of the devices according to the present invention include very high tolerance to low quality of the irrigating liquid (including in terms of the size and percentage of mechanical impurities) while at the same time being highly efficient of interaction of the irrigating liquid with the gas being purified; this greatly reduces the costs of chemicals used as well as the costs of storing and supplying these chemicals. For example, to reduce or neutralize acidic gases one may use lime wash without prior filtering of sand, which is always present in lime in nature.

This high efficiency allows using grid plates with openings, as shown in FIG. 2a-2d, and on gaps δ1-δ4 (on FIGS. 3a-3d, 4a-4c, and 6a-6d) of about 15-40 mm and even larger and slots 10-20 mm wide and even larger; the ratio of cumulative cross-section area of openings or slots to the total area of the grid plate is 0.15-0.3.

In a device according to this invention used for filtering ashes from a coal smoke 99.5% of ashes were captured. The output of purified gas at 170° C. was 20,000 m³/hour. The dimensions of the device were about 1.5 m×1.6 m×2.5 m. The hydraulic pressure of the fed gas did not exceed 1.9 kPa. The irrigating liquid was water circulating within a close contour between the device and a simple ash precipitator. The concentration of particles in the water used for irrigation was between 3% and 5%, which is unacceptably high for most other types of systems used for this purpose.

Another device according to this invention was used for removing HCN from the air used to ventilate leaching chambers for gold ore. The output was 12,300 m³/hour. The absorption of HCN was 94%-96% with input concentration of 0.2-0.4 g/m³. The irrigating liquid was a water solution of unfiltered lime milk with a high content of sand pebbles of up to 5 mm in size. This solution cannot be used for most other types of systems used for this purpose.

In both cases the grid plate was an array of quadrangular swirling nozzles as shown in FIG. 4a; each nozzle being 100×100 mm in size and producing gas jets at 71° angle off the vertical. The ratio of cumulative cross-section area of openings to the total area of the grid plate was 0.227. In the first device the grid plate was composed of 135 such nozzles, in the second device the grid plate was composed of 81 such nozzles.

The swirls from the nozzles are usually contained within 20 mm above the grid plate, while further above the motion of gas and of gas-liquid mix is turbulent and/or chaotic and/or forms a foam.

The foregoing description of preferred embodiments of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the current application in various embodiments and with various modifications as are suited to the particular use contemplated. All such modifications and variations are within the scope of the subject application as determined by the appended claims, when interpreted in accordance with the breadth to which they are fairly, legally and equitably entitled.

What is claimed is:

1. A device for mixing fluids, comprising:
   a housing;
   a substantially upward path for a first fluid;
   a plurality of nozzles forming a substantially two-dimensional grid across the path for the first fluid to pass through the grid; and
   an injecting nozzle positioned above the grid for a second fluid into the path above the grid;

wherein the plurality of nozzles forming a substantially two-dimensional grid comprise a three-dimensional structure with a plurality of axial swirler blades inside the three-dimensional structure;

wherein the nozzles are shaped and positioned within the grid so as for the first fluid passing through the grid to form within the path above the grid for each of the plurality of nozzles at least one jet of the first fluid, wherein a mixing layer is formed above the grid;

for a plurality of the jets to interact to form within the path above the grid non-linear flow of the first fluid; and for the non-linear flow of the first fluid to contact and interact within the path above the grid with the second fluid injected into the path, wherein the first fluid and the second fluid are mixed within the mixing layer above the grid.

2. The device of claim 1, wherein the non-linear flow of the first fluid comprises at least one substantially upwardly flowing swirl.

3. The device of claim 1, wherein the plurality of nozzles are shaped and positioned within the grid so as for the first fluid passing through the grid to form within the path above the grid for each of the plurality of nozzles jets of the first fluid; for a plurality of the jets from the plurality of nozzles to interact to form within the path above the grid non-linear flow of the first fluid; and for the non-linear flow of the first fluid to contact and interact within the path above the grid with the second fluid injected into the path.

4. The device of claim 3, wherein the non-linear flow of the first fluid comprises substantially upwardly flowing swirls.

5. The device of claim 4, wherein the swirls are rotating in substantially same direction.

6. The device of claim 1, wherein the first fluid is gas.

7. The device of claim 1, wherein the second fluid is liquid.

8. The device of claim 1, wherein the nozzles are slots.

9. The device of claim 8, wherein the nozzles are slots narrowing upwards.

10. The device of claim 8, wherein the nozzles are parallel slots.

11. The device of claim 1, wherein the nozzles are perforations with sloping elements extending downwards from the grid.

12. The device of claim 1, further comprising the nozzles forming a substantially two-dimensional second grid across the path for the first fluid to pass through the second grid; wherein the injecting part for a second fluid into the path is above the second grid; and wherein the nozzles are shaped and positioned within the second grid so as for the first fluid passing through the second grid to form within the path above the second grid for each of the plurality of nozzles at least one jet of the first fluid; for a plurality of the jets to interact to form within the path above the second grid non-linear flow of the first fluid; and for the non-linear flow of the first fluid to contact and interact within the path above the second grid with the second fluid injected into the path, wherein the first fluid and the second fluid are mixed within the mixing layer above the grid.

* * * * *